Feb. 9, 1965 J. N. BINNS 3,168,846
CONTOUR ROLL-TURNING LATHE
Filed Nov. 12, 1959 5 Sheets-Sheet 1

INVENTOR.
JACK N. BINNS
BY
J. Warren Kinney Jr.
ATTORNEY

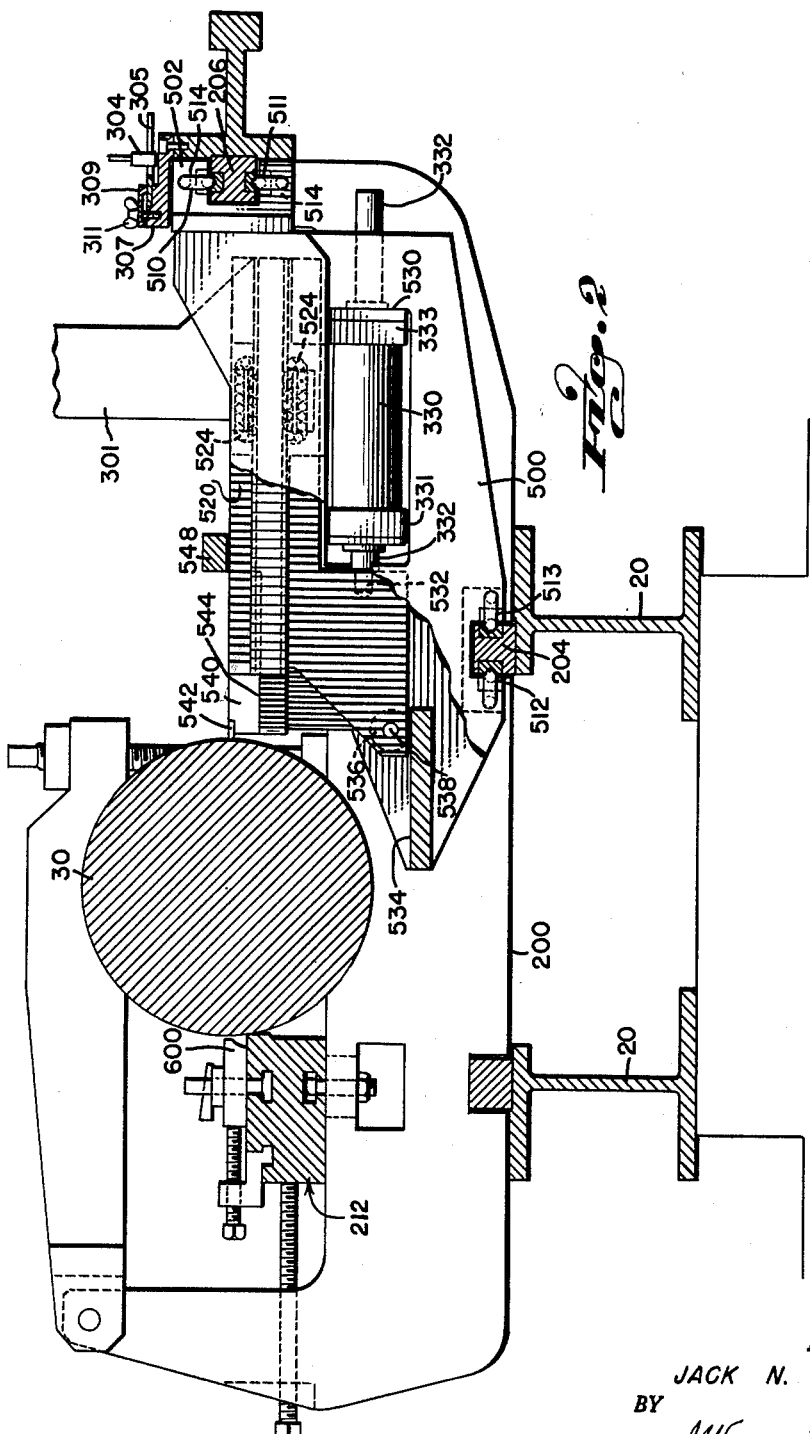

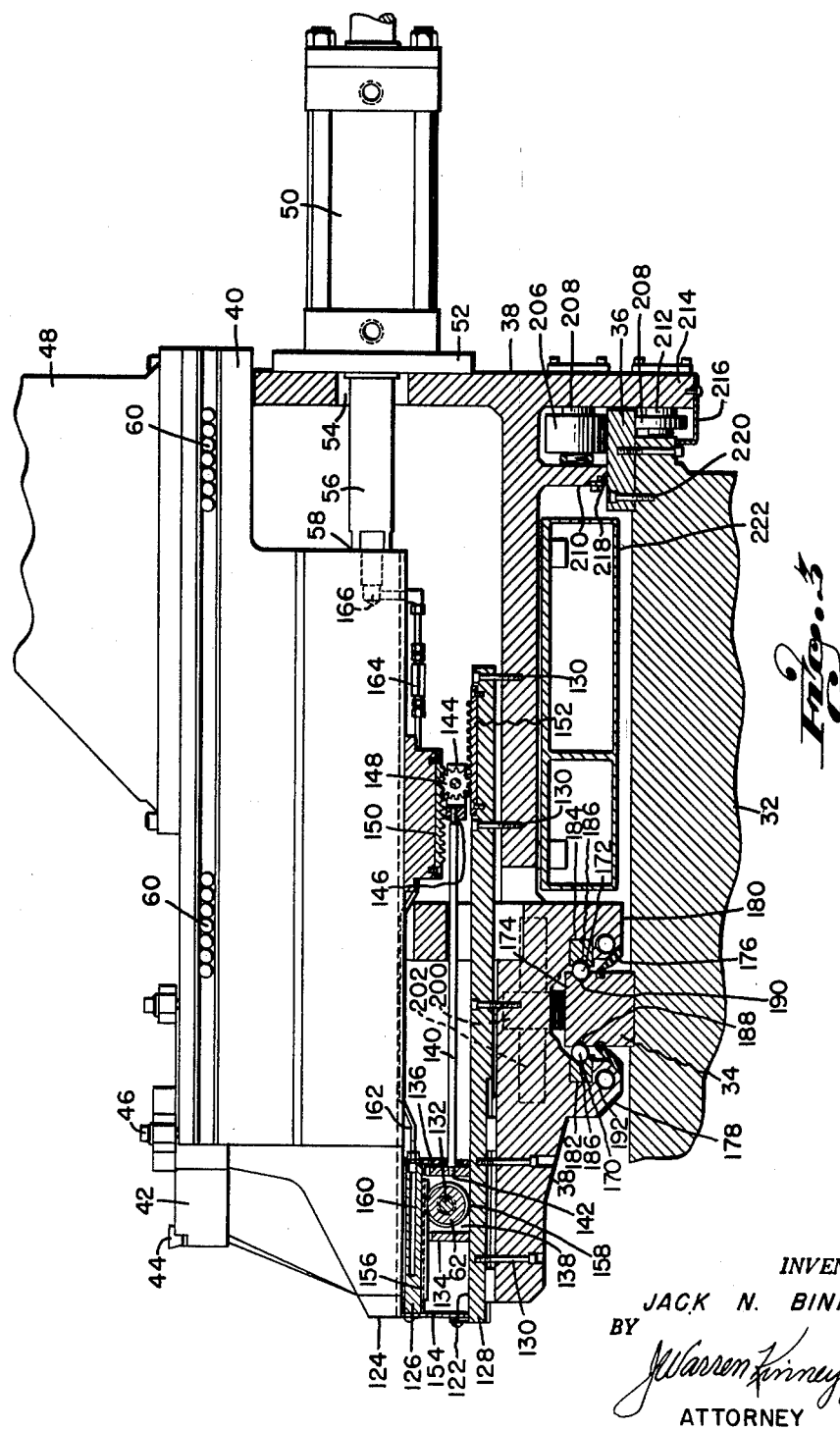

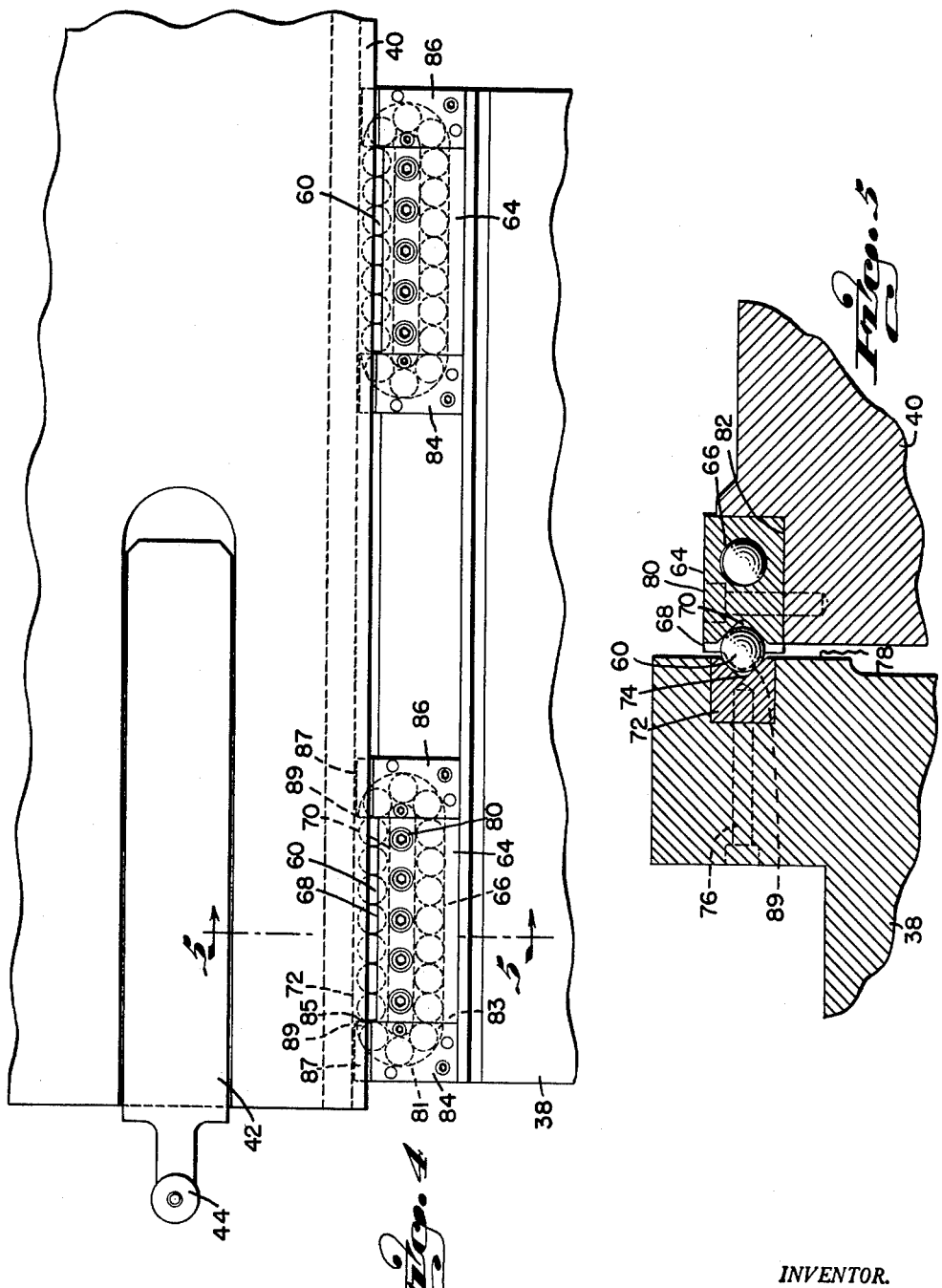

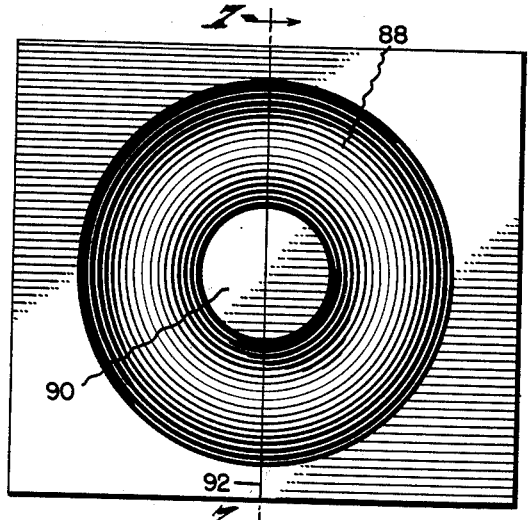
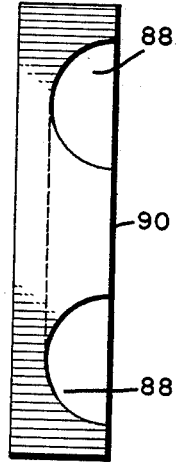
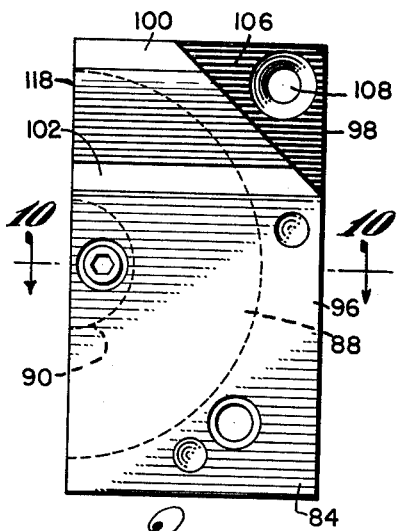
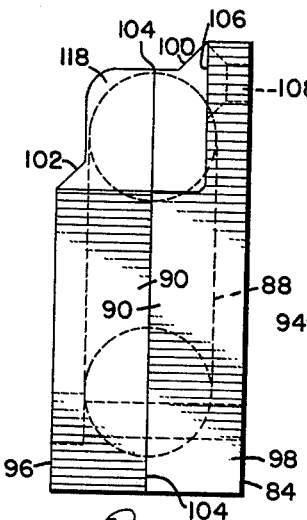
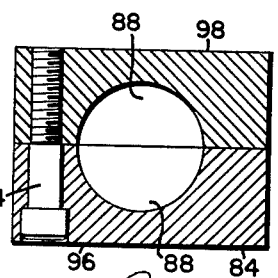
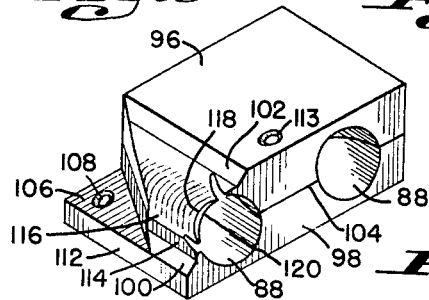

United States Patent Office 3,168,846
Patented Feb. 9, 1965

3,168,846
CONTOUR ROLL-TURNING LATHE
Jack N. Binns, 4886 Oaklawn Drive, Cincinnati, Ohio
Filed Nov. 12, 1959, Ser. No. 852,377
15 Claims. (Cl. 82—2)

This invention relates to a lathe, and particularly to a roll-turning lathe for the shaping of large rolls of the type used in steel mills for the rolling and shaping of metal sheets, bars, and other shapes.

The present application is a continuation-in-part of my pending application Serial No. 648,396, filed March 25, 1957, now Patent No. 3,022,690.

An object of the invention is to provide a roll-turning lathe having improved and highly effective anti-friction ball means incorporated therein, for supporting the cross-slide and saddle of the machine.

Another object is to provide novel means for constructing and assembling the improved anti-friction ball means aforesaid.

Another object of the invention is to provide over-deflection means in association with the anti-friction ball means, designed to relieve the latter of destructive forces which might result from exceedingly heavy cutting action of the tool upon the roll or workpiece.

A further object of the invention is to provide a saddle and cross-slide assembly having the features above mentioned, which permits positioning of the tool against the workpiece without interference from the overdeflection means for the saddle, so that the tool is accessible to perform all manner of cuts required in the turning operation, irrespective of the size or shape of the workpiece.

These and other objects are attained by the means described herein and disclosed in the accompanying drawings, in which:

FIG. 2 is a view of the cross-slide partly in section through the lathe on a transverse vertical plane, near the center of the cross-slide of FIG. 1.

FIG. 3 is a vertical cross-section similar to the structure illustrated at the right side of FIG. 2, showing on enlarged scale a modified construction incorporating certain improvements of the present invention.

FIG. 4 is a fragmentary top plan view, on an enlarged scale, of the left end of the FIG. 3 illustration.

FIG. 5 is an enlarged cross-sectional view taken on line 5—5 of FIG. 4.

FIG. 6 is a plan view of a block or plate of metal partly formed, to produce a pair of ball return elements for the anti-friction ball means used in supporting the cross-slide and saddle of the lathe.

FIG. 7 is an end view of one of the ball return elements, as viewed upon line 7—7 of FIG. 6.

FIG. 8 is a plan view of the ball return elements of FIG. 6 assembled, and formed to completion, to produce a complete ball return.

FIG. 9 is an end view of the FIG. 8 assembly, as viewed from right to left upon FIG. 8.

FIG. 10 is a cross-sectional view taken on the line 10—10 of FIG. 8.

FIG. 11 is a perspective view of the assembly shown in FIGS. 8 and 9.

Figure 1:
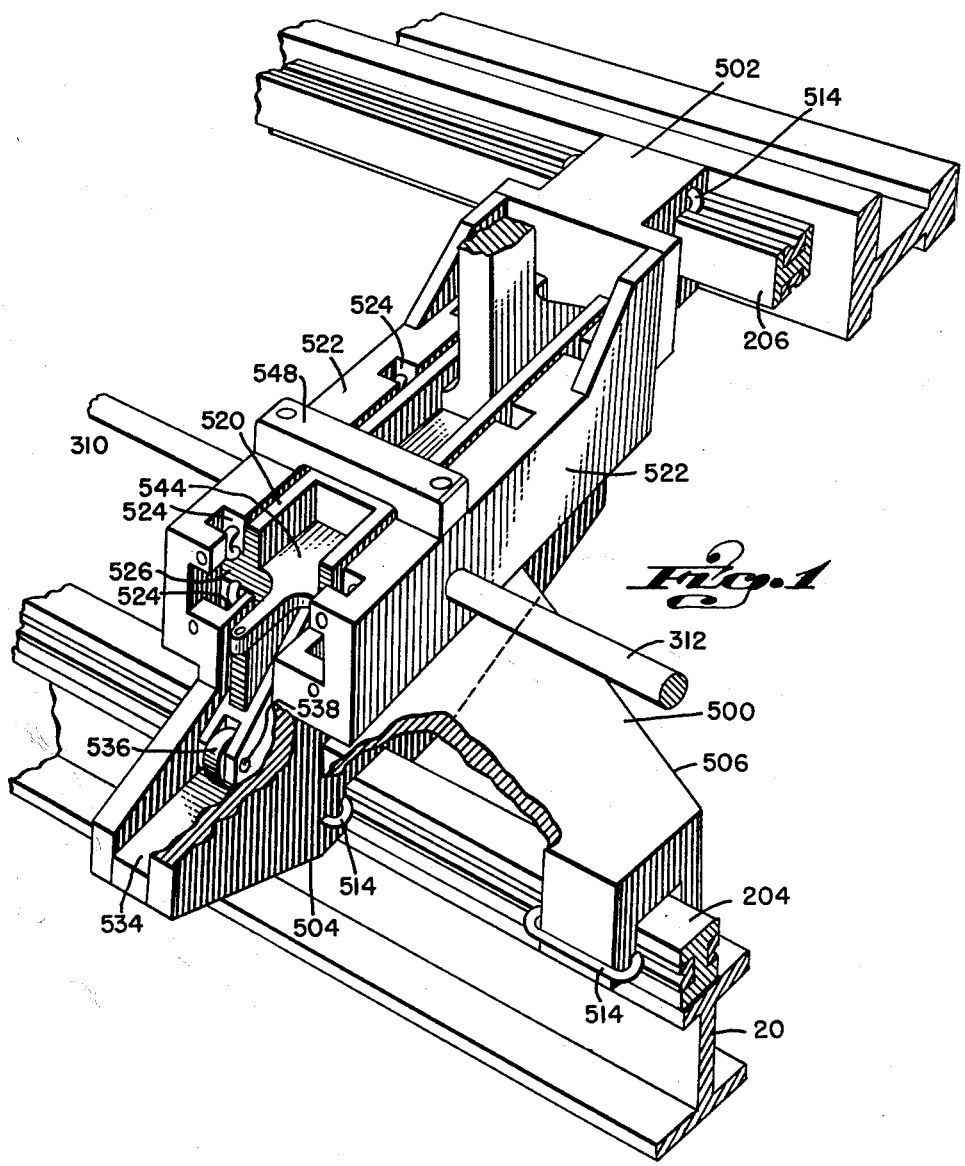
FIG. 1 is a perspective view of the saddle and cross-slide portion of the lathe disclosed in my copending application Serial No. 648,396.

The counter roll-turning lathe in its entirety is disclosed in my copending application aforesaid, and reference may be had thereto for any generalities of structure that may be considered helpful in correlating the elements of the present invention.

According to FIGS. 1 and 2 hereof, the numerals 20 denote generally a pair of elongate laterally spaced bed rails which form the bed plate of the lathe, and upon one of which is fixed a slide 204 supporting the saddle or carriage 500 for longitudinal traverse by means of the hydraulic piston rods 310 and 312. A second slide 206 also supports the saddle, at its forward portion. Thus the saddle is supported for movement longitudinally of the workpiece or roll 30 undergoing shaping.

In FIG. 2, 200 indicates a housing which carries a rest bar 212 for supporting a cutting tool 600; and this housing also carries means in the form of neck chucks or bearings to support the workpiece while turning, all of which is foreign to the present invention and need not therefore be disclosed here in detail. Accordingly, all of the structure shown at the left of workpiece or roll 30 in FIG. 2, may be disregarded so far as the present invention is concerned. It is necessary, however, that the roll or workpiece 30 be rotatably supported for turning, with the cutting tip 542 of a tool 540 operative thereon. Suitable means supporting the roll for turning is disclosed in my copending application aforesaid.

The cross-slide of the carriage or saddle is indicated at 520, and is subject to such movement as will advance and retract the tool 540 relative to the workpiece. The cross-slide may be traversed toward and from the workpiece, preferably under the control of a tracer finger indicated generally at 304, by means of a cross-feed cylinder 330. This cylinder may be secured to and carried by the saddle 500 as shown at 530, FIG. 2. Its piston rod 332 is connected at its forward end to the cross-slide 520, as shown at 532, FIG. 2, whereby endwise axial movement of this piston rod will move the cross-slide toward and from the workpiece. As clearly illustrated in FIG. 2, piston rod 332 extends completely through the heads 331 and 333 of the cylinder 330, thereby providing equal working areas on opposite sides of its piston.

In FIGS. 1 and 2, the numeral 500 denotes generally the saddle or carriage as before stated, the saddle including an outer bearing portion 502 which engages and rides upon outer slide 206. The saddle also includes a central inner bearing portion 504 and an outboard bearing portion 506, wherein the inner bearing portion 504 and the outboard bearing portion 506 slidably engage, and are supported by, the inner slide 204.

The outer bearing portion 502 includes upper and lower sets of re-circulating balls, denoted generally by the numerals 510 and 511. Said balls engage and roll between complementary ways at outer bearing portion 502 and outer slide 206, providing free longitudinal movement of the outer bearing portion on the outer slide while effectively precluding motion transverse thereto, thereby providing a linear slide of anti-friction characteristics.

Similarly, re-circulating anti-friction balls 512 and 513 are disposed between inner slide 204 and both the outboard bearing portion 506 and the inner bearing portion 504. In this manner the inner portion of the saddle is confined to linear motion in parallelism with the linear motion of the outer end thereof, and movement in any and all other directions, including rotation, is eliminated. In FIG. 1, the numeral 514 denotes, generally, duplicates of ball return tubes in which the balls 510, 511, 512 and 513 re-circulate for providing the anti-friction mounting illustrated in FIG. 2.

The numeral 520 in FIG. 1 denotes generally the cross-slide portion of the carriage or saddle, said cross-slide being mounted on anti-friction means for movement toward and from the axis of the lathe and at right angles to the longitudinal movement of the saddle.

With particular reference now to FIG. 1, the numerals 522 represent portions of the saddle which contain bearing portions 524. Balls are interposed between these various bearing portions 524 and complementary portions 526 of the cross-slide, thereby mounting the cross-slide for pure linear motion at right angles to the axis of the lathe. This bearing suspension also effectively precludes any twisting or rotational movement of the cross-slide relative to the saddle.

Referring to FIG. 2, it will be noted that cylinder 330 is utilized for imparting endwise movement to the cross-slide, said cylinder being rigidly secured to and carried by the saddle as at 530. One end of the piston rod 332 extends through a complementary opening in the saddle. The other end of piston rod 332 engages the cross-slide as illustrated in FIG. 2 at 532. The numeral 534 of FIGS. 1 and 2 denotes a track which is rigidly secured to, and comprises a part of, the inner, or tool supporting end of the saddle. A roller 536, journalled as at 538 to the inner end of the cross-slide, is normally disposed just out of contact with the upper supporting surface of track 534. The relationship of roller 536 to track 534 is such that the roller will only engage the track after the tool supporting end of the cross-slide has been deflected downwardly by a very minute dimension induced by an excessive deflecting load applied to the tool supporting end of the cross-slide. The purpose of this relationship is to preclude excessive load on the more precise ball-ways of the cross-slide by transfer of a large portion of heavy loads from the ball-ways to the heavier bearing support effected by the roller 536 and track 534, particularly during roughing cuts.

In FIG. 2, the numeral 540 denotes generally the shank of a tool and the numeral 542 the cutting tip thereof.

With reference now to FIG. 1, the numeral 544 denotes the tool post or tool platform on which the shank of tool 540 is suitably secured by any means not germane to the present invention. A tie bar 548 spanningly engages and rigidly interconnects side portions 522 of the saddle which are disposed on opposite sides of the cross-slide.

It may here be noted that the hydraulic tracing system utilized for control of the cross-slide, is a well known expedient for the purpose. Usually it comprises a tracer finger such as 304, which engages and follows a suitable templet, of the shape to be reproduced in roll 30. Template 305 may be secured to the template bracket 307 by means of clamp bars 309 and thumb screws 311, as well known in the art. The present invention is neither concerned with nor directed to the structural or operating details of the tracer mechanism. However, for convenience of detail and understanding reference is made to U.S. Patent No. 2,332,533. The character 301 indicates a bracket on cross-slide 520, adapted to carry the usual tracer box, not shown, containing the tracer mechanism.

The cross-slide and saddle construction illustrated by FIG. 3, constitutes a modification and improvement over that illustrated in the right half of FIG. 2. Here the lathe bed 32 carries a pair of longitudinally extending bed rails 34 and 36 which support the saddle or carriage 38 for shifting movement lengthwise of the lathe. The cross-slide is indicated at 40, and carries a cutting tool 42 whose cutting tip is shown at 44. Conventional means 46 may be employed to secure the tool upon the cross-slide, with the tool extending toward the workpiece. A bracket for a tracer box is indicated at 48.

For moving the cross-slide toward and from the workpiece, a double-acting hydraulic cylinder 50 may be used as the motive means, preferably under the control of a conventional tracer mechanism. The base 52 of the cylinder may be fixed to the carriage 38 about an opening 54, permitting the piston rod 56 to reach the cross-slide at 58, where it is anchored thereto. Hydraulic means may be employed also to traverse the carriage 38 along the bed rails 34 and 36, as was explained in the description of FIG. 1 wherein 310 and 312 represent hydraulic cylinder piston rods for the purpose.

In its movements across the carriage, the cross-slide is to be supported upon anti-friction bearings including large bearing balls 60 arranged in groups or units located near the front and rear ends of the cross-slide. The bearing units are of unique construction or design, employing oversize bearing balls, and adapted to withstand the very heavy loading thereof resulting from the massive proportions of the cross-slide and the extremely heavy tool cuts attending roll-turning operations. In addition to the bearing balls 60, other supporting means for the cross-slide may be provided, in the form of an over-deflection roller 62 located beneath the tool 42, details of which will be disclosed hereinafter.

The ball units are best illustrated by FIGS. 4 and 5, wherein 64 indicates an elongate block or body of metal or other suitable material generally rectangular in form, and of a width and thickness exceeding the diameter of the bearing ball 60. From end to end the block is bored to provide a passageway 66 in which the balls may freely roll.

Along one side edge 68, the block 64 is longitudinally grooved as at 70 to provide a race in which the balls 60 may move longitudinally of the block, the race being of such dimensions as to accommodate nearly half of the ball mass. Those balls which are exposed along the outer race 70 will be confined by a secondary block 72, elongate in form, and longitudinally grooved as at 74 to provide a raceway for the exposed balls of primary block 64. The secondary block 72 may be bolted as at 76 to the cross-slide 38, and may be embedded as shown in FIG. 5, into an upright face 78 of the slide structure.

Primary block 64 is carried by the saddle 40, and may be secured thereon by means of a row of screws 80 holding the block within a longitudinal recess or shelf 82 provided on the saddle. The block 64 is so located upon the saddle as to place its raceway 70 in direct opposition to the raceway 74 of block 72, with clearance for balls 60 therebetween.

Referring now to FIG. 4, it will be understood that movement of cross-slide 40 to the left, for example, will cause all the bearing balls in contact therewith to advance toward the left, at half the speed of slide-advancement. If the balls so moved are directed around the end of block 64 to enter the enclosed passageway 66, the run of balls in the enclosed passageway will be displaced in a direction opposite to that of the slide advancement, and such displaced balls are to be directed around the opposite end of block 64 to replace the balls which left the exposed or exterior raceway 70 during the cross-slide advancement.

The means provided for directing or guiding the balls around the ends of block 64 under the conditions above stated, consists of a pair of ball return end blocks or caps 84 and 86, fixed relative to the primary or intermediate block 64. Each end block or cap may be fabricated from a thick rectangular block of metal or the like, machined to provide therein a semi-circular ball way 81. One end 83 of the ball way is adapted to register with the ball way 66 of block 64, so that the balls may pass from one of the ball ways to the other.

The remaining end 85 of ball way 81 is aligned with the row of balls that ride in the cross-slide race 70, so that these balls may pass into and from the curved ball way 81. As indicated at 87, the ball return blocks extend laterally beyond the side edge 68 of block 64, to partly enter the groove 74 of secondary block 72, for intercepting and directing the balls 60 into the curved ball way 81. The extension 87 has a formed edge 89 developed into scoop shape, for so directing the balls. The scoop is indicated at 89 upon FIG. 5.

As will be understood, scoop 89 not only intercepts and guides balls 60 into the ball return end block 84, but acts also in reverse to direct balls from the end block into the raceway between the cross-slide and the saddle. Block 86 is constructed similarly to block 84, and includes a similar scoop 89.

A method of constructing the ball return end blocks will be rendered apparent in the description attending FIGS. 6 to 11, later to be treated herein.

Attention is now directed to FIG. 3, particularly with respect to the over-deflection roller 62 the purpose of which is to assume any excessive downward force imposed upon the cross-slide at its tool-bearing end, when the tool 42 is under very heavy cutting load. Normally, the sets of bearing balls 60—60 assume the weight of the cross-slide and the load imposed thereon incident to cutting action of the tool. In the event of very heavy cutting, however, it is advisable to relieve the bearing balls of part of the load in order to preclude possible damage thereto. The over-deflection roller 62 performs this function.

Roller 62 rests upon a plane surface or track 122 of a platen 128, which latter is fixed to and movable with the saddle 38, bolts or screws 130 being employed for this purpose. The cross-slide 40 carries a complementary platen 126, which is in spaced parallelism with platen 128. Between the relatively movable platens 126 and 128, the roller 62 may advance and retract with the cross-slide movements, while resting upon track 122. The roller has very close clearance with upper platen 126, so that downward deflection of the tool end of the cross-slide, occasioned by heavy loading of the tool, will promptly place the upper platen 126 in firm contact upon the top portion of the roller, thereby forcing the roller to assume part of the load that would otherwise be borne totally by the ball units 60.

From the foregoing, it will be understood that notwithstanding transfer of part of the load to the over-deflection roller 62, the ball units of the cross-slide will still function to provide frictionless support and accurate guidance of the cross-slide as it feeds the tool in and out. At the same time, the danger of scoring or otherwise injuring the bearing balls will be greatly minimized.

In order that roller 62 may perform maximal service with little attention, and infrequent replacement, it is permitted to move between the platens with great freedom. What appears to be a roller shaft at 132, is merely a guide rod passing loosely through a central enlarged opening in the roller, to prevent the roller from rubbing against the upright front and rear walls 134 and 136 of a rectangular cage 138 which moves bodily with the roller 62. The cage height is considerably less than the distance between platens 126 and 128, so that the cage may slide upon platen track 122 without contacting the upper platen 126. Guide rod 132 has its opposite ends supported by opposite side walls of the cage.

Cage 138 is subject to positive shifting in the direction of travel of roller 62, this shifting movement being effected by a tie rod 140 connected to the cage wall 136 at 142, and to a traveling pinion block 144 at 146. The pinion 148, rotatably mounted upon the block 144, is in constant mesh with a pair of opposed toothed racks 150 and 152, one of which, 150, is fixed to the cross-slide, and the other of which is fixed to the saddle through the agency of platen 128.

When the cross-slide is reciprocated transversely of the saddle 38, the racks drive the pinion and block 144 for moving the cage 138 at the speed of travel of the roller 62, which is one-half of the cross-slide speed. From the foregoing, it is understood that over-deflection roller 62 may travel practically unrestrictedly along the length of track 122 as the cross-slide is advanced and retracted, while assuming all the overload imposed by heavy tool cuts. The roller 62 is obviously well placed almost directly beneath the tool, to assume the load.

The character 154 indicates a wiper or shield depending from the snout end 124 of the cross-slide, to sweep the track 122 and prevent entry of foreign matter and dust between the platens 126 and 128. The wiper or shield moves with the cross-slide.

At 156 is indicated a depending elongate rib attached to the cross-slide platen 126, and extending in the direction of travel of roller 62. This rib rides in a circumferential center groove 158 of roller 62, to prevent lengthwise shifting of the roller against the sides of box 138.

Lubricant for the over-deflection roller 62 may be conveyed thereto from a bore 160 in platen 126, which bore communicates with the interior of box 138. An oil line 162 leads from bore 160 rearwardly to a coupling 164 and connection 166, where oil under pressure may be intermittently supplied to the oil line from a suitable source of supply.

It may here be noted that disposition of the over-deflection roller 62 and track 122 is such that these parts extend a minimal distance beyond the tool tip 44. The structure that extends beyond the tool tip is referred to as the "snout" of the cross-slide, and is indicated generally by the reference character 124. By reason of the arrangement indicated, the size and extent of the snout are reduced to a practical minimum so as to present no interference with the turning and shaping of workpieces which are quite large, or which require deep and intricate tool cuts that bring the workpiece close to the snout during the turning operation.

As was previously mentioned herein, the saddle 38 is adapted to be moved longitudinally of the lathe axis along the rails 34 and 36, preferably by means of hydraulic cylinder power imposed by piston rods such as are indicated at 310 and 312 of FIG. 1. Anti-friction means for support of the saddle are shown upon FIG. 3, wherein 170 and 172 indicate generally the same type of ball bearing devices previously described in connection with FIGS. 4 and 5. The ball bearing means for the saddle differ from that of FIGS. 4 and 5, in that the runs of balls according to FIG. 3 are disposed in planes which, instead of being horizontal, are angularly disposed relative to the top face 174 of bed rail 34. Dust guards for the bearings are indicated at 176.

Referring to FIG. 3, the saddle includes a pair of spaced depending rail guides 178 and 180 which overhang opposite sides of bed rail 34, and these guides carry raceway bars 182 and 184 longitudinally grooved in their upright sides to provide raceways 186 for the rows of balls 170 and 172. Complementary raceways 188 and 190 for said balls are provided in the side walls of rail 34.

The rail guides 178 and 180 are of limited length in the direction of extension of the rail 34, and each such guide is drilled longitudinally as at 192 to loosely accommodate a row of balls, in the same manner as block 64 of FIGS. 4 and 5 supports a row of balls in its passageway 66. The bores 192 are open-ended, like the bore 66 of block 64 (FIG. 4), so that the open ends thereof require the use of ball return end blocks similar to those disclosed at 84 and 86 of FIG. 4, for ensuring a continuous circulation of balls through each bore 192 and along the raceway above it, indicated at 186–188, as the saddle moves lengthwise of rail 34.

The ball return end blocks to be fixed to opposite ends of rail guides 178 and 180, for recirculating the two rows of balls associated with each rail guide, may each be fabricated in accordance with FIGS. 6 to 11. As shown in these views, the ball return end block may be fabricated from a thick rectangular block of metal or the like, FIG. 6, turned or formed to provide in one face thereof a circular half-round track or raceway 88, circumscribing a central stool 90. Prior to formation of the raceway and stool, the block is cut through along a diametral line 92 which bisects the stool and the raceway to form two identical blocks having the configuration of FIG. 7. The raceway is dimensioned to freely receive a ball such as 170, and to loosely embrace half of its area. Thus, when two such blocks are bolted together as at 94 in FIG. 10, a full ball-way is produced in which balls such as 170 may freely move while confined.

As indicated by FIGS. 8 to 11, the two block parts 96 and 98 are differently formed following the initial severance indicated upon FIG. 6, to impart certain characteristics to each. Block part 98 is milled to provide opposed flats 100 and 102 at opposite sides of a raceway 88, lying in a common plane disposed substantially at 45 degree angularity to the meeting line 104 of the block parts. The flats define a limited continuation of the ball way 186 when the ball return end block is located at one end of rail guide 178.

Block part 98 may be further milled away at one corner thereof to provide an anchoring ear 106 drilled at 108 to receive a screw or other fastener whereby the composite end block may be mounted upon the saddle, in end-closing relationship to the bore 192 or rail guide 178.

Referring to FIG. 11, it will be seen that the flat 100 is flanked by an end 112 of block part 98, and an upstanding wall 114 which intersects the adjacent raceway 88 at the parting line 104 of the block parts.

The upper block part 96, FIG. 11, between the flat 102 and the adjacent end 116 of said block, is developed to provide a thin-lipped scoop 118, the function of which is to direct individual bearing balls into the ball-way 88, from the raceway between the parts 182 and 34 of FIG. 3, as the balls move incident to shifting of the saddle as previously explained. The scoop 118, of course, operates also to direct the balls from the FIG. 11 ball return device, into the raceway between the parts 34 and 182, upon reverse shifting of the saddle. In fact, the scoop of one ball return device operates to direct bearing balls into its own ball return device, while the scoop of the other ball return device is delivering balls, to the ball raceway between the rail 34 and bar 182.

The exposed or lip end of scoop 118 projects from the composite ball return device, tangentially from the mouth of the raceway 88, and in the general direction of extension of the bed rail 34. The inside surface 120 of the scoop follows and is part of the raceway 88. As will be understood, scoops such as 118 are needed only at locations where the bearing balls 170 leave and enter the raceway between the rail 34 and bar 182, that is, at opposite ends of the exposed groove 186 of bar 182. Those bearing balls which are not under load imposed by the saddle thereon, travel idly through the fully enclosed passageway 192 of guide 178, and similarly through the curved passageways or raceways 88 of the ball return end blocks 84 and 86.

By means of the ball return elements above described, the bearing balls of a given group or unit are recirculated within limits defined by the ball return elements, and none of the balls are capable of wandering from such confines into other areas of the continuous ball-ways between the bed rail 34 and the saddle part 178.

As will readily be appreciated, the structural features of the ball bearing units are indicative of great durability and resistance against the power of the balls, when under heavy load, to drive the ball return devices out of position relative to the opposite ends of guides 178 and 180. The bearing units as herein disclosed are required to confine and control the movements of large bearing balls, an inch or more in diameter, driven along the ball-ways under very heavy load, and therefore with almost irresistible advancement power. Scooping the balls from such ball-ways is of course an important feature of the invention.

From the foregoing, it will readily be understood that the ball return end blocks 84 and 86 of FIG. 4 can be fabricated substantially in accordance with the basic teaching of FIGS. 6 to 11, with great ease and economy. Such blocks 84 and 86 are of course simpler than those of FIG. 11, due to the fact that they need not be fitted angularly to the raceways 70 and 74, as is necessary at the guides 178 and 180 of FIG. 3. Ball return end blocks such as FIG. 11 discloses are employed at the opposite ends of each rail guide 178 and 180; that is, four such end blocks are needed for controlling the circulation of balls 170 at opposite sides of bed rail 34.

The saddle may include several pairs of rail guides such as 178 and 180 flanking the bed rail 34, and accordingly, a ball arrangement as shown may be applied to each pair in order to adequately support the saddle.

In order to relieve the balls 170 of undue wear and possible damage that might result from very heavy cutting action of tool 44, an over-deflection roller 200 may be journalled on the saddle, as by means of a shaft 202, to ride upon the top face 174 of bed rail 34. By preference, the roller 200 assumes no part of the load carried by the bearing balls 170, until the load becomes excessive. As will be understood, a plurality of over-deflection rollers such as 200 may be applied to the saddle, if desired, each adapted to take part of any overload resulting from heavy cutting action of the tool.

To preclude tilting of the saddle when tool 44 is under load, and to normally support that portion of the saddle which is remote from the tool, an outboard stabilizing means may be provided in the form of rollers 206 and 208 arranged to ride upon the upper and lower faces, respectively, of bed rail 36. Roller 206 may be carried by a short shaft 208 having opposite ends supported horizontally by the rear wall and a depending part 210 of the saddle. The second roller 208 may be rotatably supported upon a stud 212 carried by the saddle rear wall extension 214, as shown. A dust guard and lubricant well for roller 208 is indicated at 216. Represented at 218 is a seal for retaining lubricant in which the roller 206 is packed.

Screws or equivalent fastening means 220 serve to fixedly mount the rail 36 upon the bed 32 of the machine. The character 222 indicates a fluid tank or reservoir carried by the saddle and having no pertinency to the present invention.

Structure as herein disclosed results in substantial economies of power consumption in the turning of massive workpieces, particularly as concerns tool feeding and carriage traversing. The use of bearing balls for the support of the carriage and cross-slide has been impractical heretofore, in machines designed for heavy cutting, because of the great forces and pressures transferred thereto resulting in scoring and mutilating of the balls and their raceways. With the improvements incorporated as disclosed herein, the use of very large bearing balls and proper control thereof, is made possible on a practical basis, so that excessive wear is eliminated and the shifting of heavy machine elements is facilitated and expedited, to great advantage. As concerns the disposition of bearings in the FIG. 3 modification, the resulting reduction in size and extent of the carriage snout is of great advantage for increasing the cutting capacity of the machine and eliminating much resetting of tools. Various other advantages, hereinbefore mentioned, result from the improvements disclosed.

It is to be understood that various modifications and changes in structural details of the machine may be resorted to, within the scope of the appended claims, without departing from the spirit of the invention.

What is claimed is:

1. A tracer controlled roll lathe including an elongate bed with work supporting means thereon, elongate slides disposed parallel to the longitudinal axis of the lathe, a saddle mounted on said slides for endwise movement thereon in parallelism with the lathe axis, a cross-slide mounted on said saddle for transverse movement to the lathe axis, and rolling means interposed between adjacent surfaces of the moving elements to impart anti-friction characteristics thereto and wherein certain of said rolling means comprise continuously operative load carrying bearing balls and others of said rolling means being constructed to become functional as auxiliary load carriers upon imposition of excessive load upon the bearing balls.

2. In a machine tool, the combination of a carriage, a tool supporting cross-slide reciprocable relative to the carriage and including a snout portion below and extending in the same direction as the tool support whereby a cutter on the cross-slide is subject to cutting forces which are directed toward the snout, ball bearing means intermediate the cross-slide and carriage providing anti-friction support for the cross-slide upon the carriage, said ball bearing means being subject to forces imposed by operation of the cutter upon a workpiece, and an auxiliary anti-friction bearing means below the snout and operatively interposed between the snout and underlying part of the carriage to assume load in excess of a predetermined value, imposed upon said ball bearing means.

3. The combination as set forth in claim 2, wherein the auxiliary anti-friction bearing means is located to lie rearwardly of a cutter supported by the cross slide and between the carriage and the cross-slide, to minimize the size and the extent of the snout in the direction of the work-piece.

4. In a machine tool, the combination of a carriage, a pair of spaced substantially parallel bed rails along which the carriage is reciprocable lengthwise, one of said rails having opposed upright sides and a top face, ball bearing raceways on the carriage and in the upright sides of the bed rail, and bearing balls in the raceways arranged to support the carriage upon the rail during reciprocation of the carriage, means for supporting a cutter upon the carriage in position to transfer force of cutting toward the bed rail and onto the bearing balls, and an over-deflection roller on the carriage above the bed rail to transmit to the top face of the bed rail, any cutting force in excess of a predetermined value.

5. The combination as set forth in claim 4, wherein is included means to circulate the bearing balls within an endless orbit as the carriage is moved lengthwise of the bed rail.

6. In a machine tool, the combination of a carriage, a bed a pair of spaced substantially parallel rails on the bed along which the carriage is reciprocable lengthwise, one of said rails having opposed upright sides, ball bearing raceways on the carriage and in the upright sides of the bed rail, and bearing balls in the raceways arranged to support the carriage upon the rail during reciprocation of the carriage, means for supporting a cutter upon the carriage in position to transfer force of cutting toward the bed rail onto the bearing balls, and over-deflection anti-friction means intermediate the carriage and the said one rail and becoming operative to relieve the bearing balls of cutting loads in excess of a predetermined value.

7. In a machine of the class described a combination of a carriage and a cross-slide, ball bearing means intermediate the cross-slide and the carriage for providing anti-friction support for the cross-slide upon the carriage, said ball bearing means including a raceway on said carriage, said cross-slide including a cooperative raceways, bearing balls between said raceways to support the cross-slide in its movement relative to the carriage, means to circulate the bearing balls within an endless orbit as the cross-slide moves relative to the carriage, the cross slide being designed to receive a load force in the operation of the machine, which load force below a predetermined value is borne by said bearing balls, and means intermediate the carriage and the cross slide for receiving and relieving the bearing balls of load forces in excess of said predetermined value.

8. In a machine of the class described, the combination of a carriage having a raceway, a cross-slide reciprocable relative to the carriage and including a cooperative raceway, bearing balls between said raceways to support the cross-slide in its movements relative to the carriage, means on the cross-slide for supporting a cutter, a forwardly extending snout on the slide below the cutter supporting means, the application of a downward force to a cutter on the supporting means being directed toward the snout and imposed upon the carriage and upon the bearing balls, a pair of spaced parallel platens underlying the carriage snout, one platen being fixed to the carriage, and the other being fixed to the cross-slide, and over-deflection roller means disposed between said platens with little clearance from the cross-slide supported platen, to absorb excessive tool-transmitted force causing deflection of the cross-slide and resultant advancement of its platen onto the roller means.

9. The combination as set forth in claim 8, wherein the over-deflection roller means comprises a roller extending transverse to the direction of movement of the cross-slide such that deflection of the cross-slide platen transmits force along the full diameter of the roller to the carriage platen.

10. In a machine of the class described, the combination of a carriage having a raceway, a cross-slide reciprocable relative to the carriage and including a cooperative raceway, bearing balls between said raceways to support the cross-slide in its movements relative to the carriage, means on the cross-slide for supporting a cutter the operation of a supported cutter upon a workpiece effecting imposition of force toward the carriage and onto the bearing balls, a pair of spaced parallel platens located beneath the cutter, one platen being fixed to the carriage and the other being fixed to the cross-slide, a roller disposed between the platens for rolling movement in the direction of cross-slide reciprocation, said roller resting upon the carriage platen and having little clearance with the cross-slide platen normally, and means for advancing and retracting the roller along the carriage platen at half the speed of cross-slide movement whenever the roller is free of contact with the cross-slide platen, the latter platen being depressible onto the roller in the event of over-deflection of the cross-slide produced by excessively heavy application of the cutter to the work-piece.

11. The combination as set forth in claim 10, wherein the means for advancing and retracting the roller comprises a lubricant box surrounding the roller, but having an open top and an open bottom to expose the roller to the platens above and below the box, and means for feeding lubricant to the roller within the box.

12. In a heavy duty lathe structure, the new combination of a bed, a carriage movable thereon parallel with the working axis of the lathe, forward and rearward carriage supporting bed rails fixed to the bed, said forward bed rail having forward and rearward vertical surfaces each having a longitudinal bearing ball raceway therein, anti-friction means interposed between the rearward bed rail and a rear portion of the carriage, said carriage having spaced parallel downwardly extending portions straddling the forward bed rail, said portions having vertical faces opposing the adjacent forward and rearward vertical faces of the forward bed rail, means forming a bearing ball raceway in the said faces of said depending portions cooperatively associated with the adjacent bearing ball raceways in the forward bed rail, bearing balls within said cooperating raceways and supporting the carriage, a platen mounted upon said carriage above and extending forwardly a substantial distance beyond said forward bed rail, said carriage including elongate spaced parallel portions rising above said platen and extending transversely of the line of movement of the carriage, an elongate cross-slide structure disposed between the said spaced parallel portions of the carriage for forward and rearward movement therebetween relative to a body of work carried by the lathe, anti-friction bearings interposed between opposite sides of said cross-slide and the adjacent portions of the carriage, said cross-slide including a tool supporting means at the forward end thereof and having a forwardly extending snout portion lying below said tool carrying means and extending forwardly beyond the tool carrying means to lie beneath a body of work engaged by a tool in the tool carrying means, an over-deflection roller lying below the tool supporting means of the cross-slide and bearing upon said platen, and a second platen carried by the cross-slide above said over-deflection roller and adapted to ride upon the roller upon downward deflection of the snout portion of the cross-slide upon imposition of a downward application of force to the forward end of the cross-slide in excess of a predetermined value.

13. The invention according to claim 12 with an anti-friction roller carried by the carriage above and adapted for rolling contact with the top of said forward bed rail, said anti-friction roller being rotatable about an axis extending transversely of the underlying bed rail.

14. The invention according to claim 12 wherein said rearward bed rail comprises a plate having top and bottom bearing faces with said first anti-friction means engaging the top surface thereof, said carriage having a depending rear portion extending across the rear edge of the rearward bed rail plate and carrying an anti-friction roller engageable with the bottom surface of said bed rail plate.

15. The invention according to claim 12 with a pair of superposed spaced parallel toothed racks between the rearward portion of the first platen and the cross-slide and mounted respectively upon the first platen and the cross-slide, a pinion gear interposed between and having toothed connection with said racks for rotation about the axis paralleling the working axis of the lathe, the said over-deflection roller being supported between opposite walls of a housing resting upon and adapted to slide forwardly and rearwardly on the first mentioned platen, and an operative coupling between said housing and said pinion gear for transmitting forward and rearward movement to the housing and the over-deflection roller at a prescribed rate in relation to the rate of movement of the cross-slide.

References Cited in the file of this patent

UNITED STATES PATENTS

| | | |
|---|---|---|
| 1,680,088 | Craig | Aug. 7, 1928 |
| 1,853,675 | English | Apr. 12, 1932 |
| 2,330,566 | Edmonds et al. | Sept. 28, 1943 |
| 2,558,275 | Siekmann et al. | June 26, 1951 |
| 2,566,116 | Chang et al. | Aug. 28, 1951 |
| 2,658,500 | Hoglund | Nov. 10, 1953 |
| 2,672,379 | McVey | Mar. 16, 1954 |
| 2,782,668 | Richet | Feb. 16, 1957 |
| 2,832,651 | Berthiez | Apr. 29, 1958 |
| 2,884,025 | Fales | Apr. 28, 1959 |
| 2,889,181 | Lang et al. | June 2, 1959 |
| 2,929,661 | Brown | Mar. 22, 1960 |